(12) United States Patent
Seres (10) Patent No.: US 6,558,148 B1
(45) Date of Patent: May 6, 2003

(54) GAS VALVE PIN MECHANISM (75) Inventor: Tristan Seres, Royal Oak, MI (US)

(73) Assignee: Incoe Corporation, Troy, MI (US)

( * ) Notice: Subject to any disclaimer, the term of this patent is extended or adjusted under 35 U.S.C. 154(b) by 7 days.

(21) Appl. No.: 09/694,533

(22) Filed: Oct. 23, 2000

(51) Int. Cl.⁷ .............................................. B29C 45/23
(52) U.S. Cl. ........................ 425/130; 425/563; 425/564
(58) Field of Search ................................ 425/130, 562, 425/563, 564, 565, 566; 264/572

(56) References Cited

U.S. PATENT DOCUMENTS

| | | | | |
|---|---|---|---|---|
| 2,940,123 A | * | 6/1960 | Beck et al. .................. | 425/170 |
| 3,070,126 A | * | 12/1962 | Schneider .................... | 137/615 |
| 4,140,672 A | * | 2/1979 | Kataoka ................. | 264/328.12 |
| 4,917,594 A | * | 4/1990 | Gellert et al. ............... | 425/549 |
| 4,942,006 A | * | 7/1990 | Loren ......................... | 264/237 |
| 5,054,689 A | * | 10/1991 | Hunerberg et al. ......... | 239/412 |
| 5,080,570 A | * | 1/1992 | Baxi et al. .................. | 425/130 |
| 5,101,858 A | * | 4/1992 | Klotz .......................... | 137/605 |
| 5,135,703 A | * | 8/1992 | Hunerberg et al. ......... | 264/572 |
| 5,151,278 A | * | 9/1992 | Baxi et al. .................. | 425/130 |
| 5,222,514 A | * | 6/1993 | Klotz et al. ..................... | 137/1 |
| 5,334,010 A | * | 8/1994 | Teng .......................... | 425/563 |
| 5,374,181 A | * | 12/1994 | Horikoshi et al. .......... | 425/546 |
| 5,466,141 A | * | 11/1995 | Eckardt et al. ............. | 425/130 |
| 5,770,237 A | * | 6/1998 | Sayer et al. ................. | 264/572 |
| 5,785,999 A | * | 7/1998 | Takayama et al. .......... | 264/572 |
| 5,882,693 A | * | 3/1999 | Silkowski et al. .......... | 425/130 |
| 5,939,101 A | * | 8/1999 | Green ........................ | 425/28.1 |
| 6,250,903 B1 | * | 6/2001 | Fernandez et al. .......... | 425/130 |

* cited by examiner

Primary Examiner—Jan H. Silbaugh
Assistant Examiner—Joseph S Del Sole (57) ABSTRACT

A valve-gate mechanism for use with gas-assisted plastic injection molding systems. A moveable pin mechanism is positioned in a bushing or machine nozzle to regulate the injection of plastic material into a mold cavity. The pin mechanism has an outer pin member and an inner pin member. Movement of the inner pin member relative to the outer pin member allows gas to be injected into the plastic in the mold cavity. A spring member, such as a Belleville washer, biases the inner pin member to a closed position relative to the outer pin member. Gas pressure from the gas source overcomes the force of the spring member allowing gas to enter into the mold cavity.

28 Claims, 4 Drawing Sheets

GAS VALVE PIN MECHANISM

TECHNICAL FIELD

The present invention relates to pin-type valve-gate bushings and nozzles for use with gas-assisted injection molding systems.

BACKGROUND OF THE INVENTION

There are many processes and techniques today for a gas-assisted injection molding. Gas-assisted injection molding processes have added flexibility to the design and manufacture of plastic parts with their ability to produce partially hollow, lightweight, rigid parts with minimal sink marks and less tendency to warp. These processes can reduce material requirements, as well as equipment costs and cycle time, and thus have advantages over conventional injection molding processes and techniques for many applications.

In general, gas-assisted injection molding systems utilize gas, under pressure, to expand the plastic material in the mold and conform it to the mold cavity details. The gaseous fluid can be introduced into the mold in several ways, such as through a bushing, or machine nozzle in one or more cavities, or in more than one location. In conventional plastic injection molding processes, the molten plastic material is injected through sprue bushings, heated or unheated, into the cavities of hollow molds. Often, two or more sprue bushings attached to a common manifold are used. In this instance, the plastic melt coming from the injection molding machine through runners is distributed by a heated distributor block (or manifold) to the individual sprue bushings. One conventional method used to control the melt flow utilizes one or more pins or needle valves, also known as valve-gate bushings.

With these systems, a needle valve is inserted through the manifold into the sprue bushing and controlled for axial movement by a hydraulic, electric or pneumatic control device or mechanism. The needle valve has an elongated pin member which is moved axially by the control mechanism and is adapted to fit within an orifice in the end of the sprue bushing in order to open and close the passageway of plastic melt from the sprue bushing into the mold cavity. A second moveable pin member can be positioned inside the elongated pin member and, via a valve mechanism at the end of the two pin members, allow gas to enter the plastic in the mold cavity.

SUMMARY OF THE INVENTION

It is an object of the present invention to provide an improved valve-gate bushing or machine nozzle for use with a gas-assisted injection molding process. It is also an object of the present invention to provide an improved valve-gate bushing or nozzle with a moveable gate pin which is biased to its closed position and utilizes gas pressure to open the gas orifice and allow gas to flow into the plastic in the mold cavity.

The present invention provides an improved valve-gate type bushing or nozzle for use with gas-assisted systems, and fulfills the object and purposes noted above. The present invention provides a pin-type valve-gate device which easily and effectively opens and closes the flow of plastic material into the mold as desired, and also easily and effectively opens and closes the gas passageway into the mold cavity.

In particular, a moveable inner pin member is provided which cooperates with an outer pin member to open and close a gas passageway for passage of gas into the plastic material in the mold cavity. The inner pin member is biased by a spring washer or the like to its valve-close position. Upon entry of gas into the annular channel between the inner and outer pin members, the gas acts on a large surface of the inner pin member which overcomes the biasing force of the spring washer and opens the gas passageway to allow gas to enter into the mold cavity and plastic material. The ends of the outer and inner pin members mate with each other creating a valve or "gate" for entry of gas material into the mold cavity.

These and other objects, features, and benefits of the invention will become apparent from the following description of the invention, when taken together in view of the accompanying drawings and appended claims.

BEST MODES FOR CARRYING OUT THE INVENTION

Figure 1:
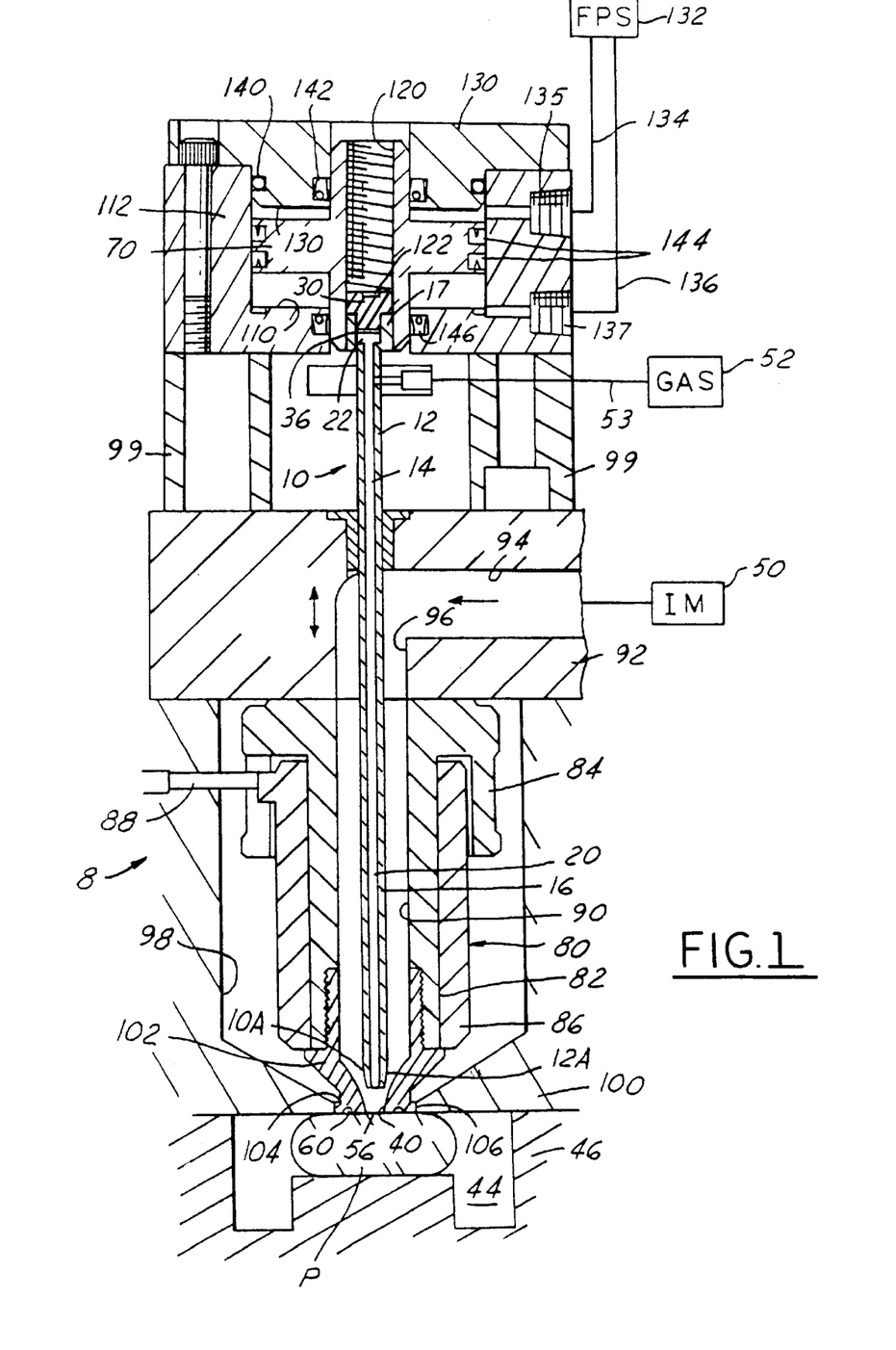
FIG. 1 depicts a representative valve-type bushing mechanism with which the present invention can be utilized.
Figures 2, 3, 4:
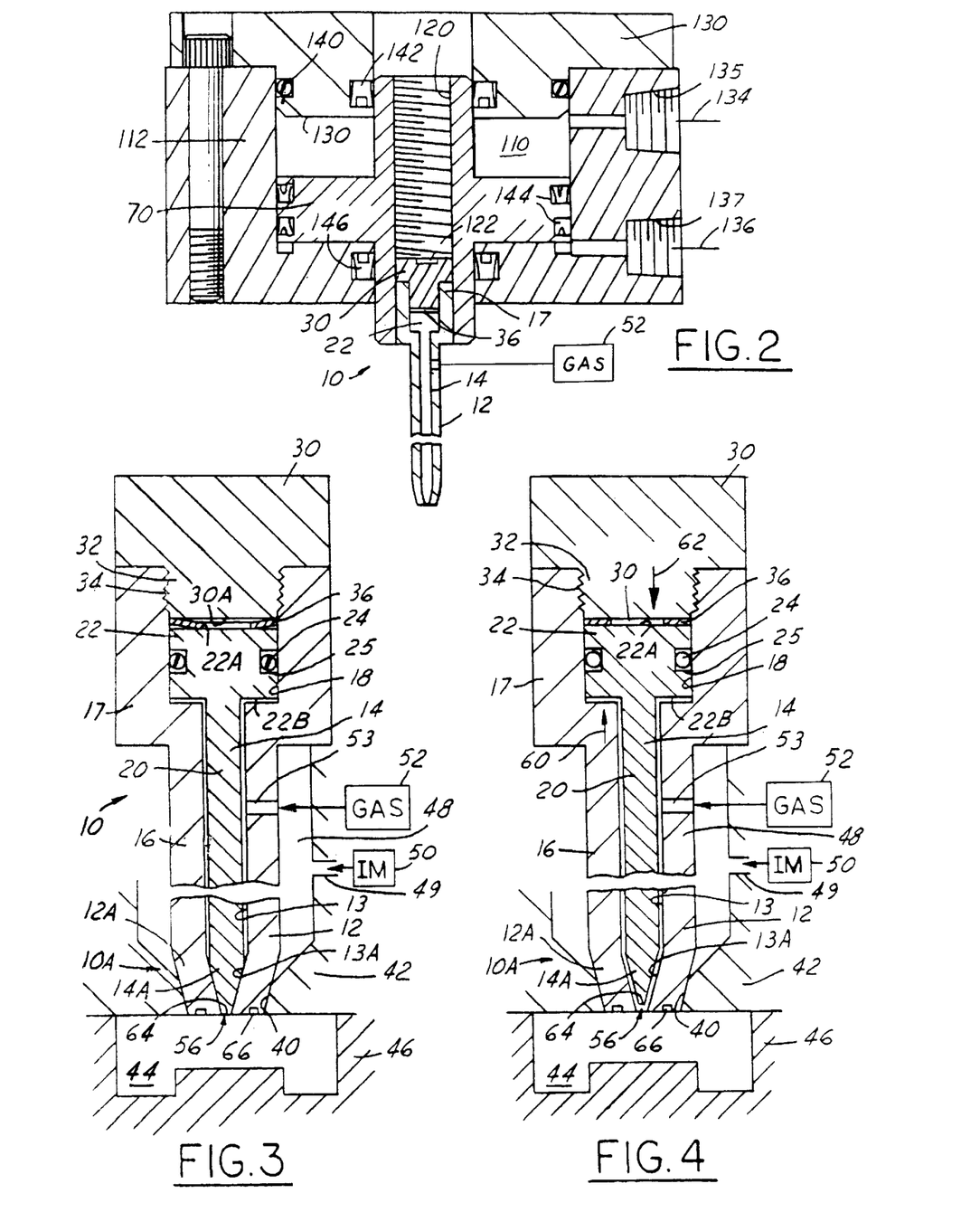
FIG. 2 is a separate view of the piston and pin mechanism shown in FIG. 1 apart from the bushing mechanism.
FIG. 3 is an enlarged view of the inventive pin mechanism in the closed position.
FIG. 4 depicts the pin mechanism as set forth in FIG. 3 but with the gas valve member in the open position allowing gas to enter the mold cavity.

FIGS. 3 and 4 illustrate a preferred embodiment 10 of the present invention, while FIGS. 1, 2, and 5–7 depict representative uses of the present invention in gas-assisted injection molding systems. In this regard, the present invention is particularly adapted to be used in gas-assisted injection molding processes or systems and will be referred to herein in that manner. However, it is to be understood that the use of the term "gas" herein is not meant to be limiting relative to the invention since other fluids may be used in place of the gas.

Figures 6, 7:
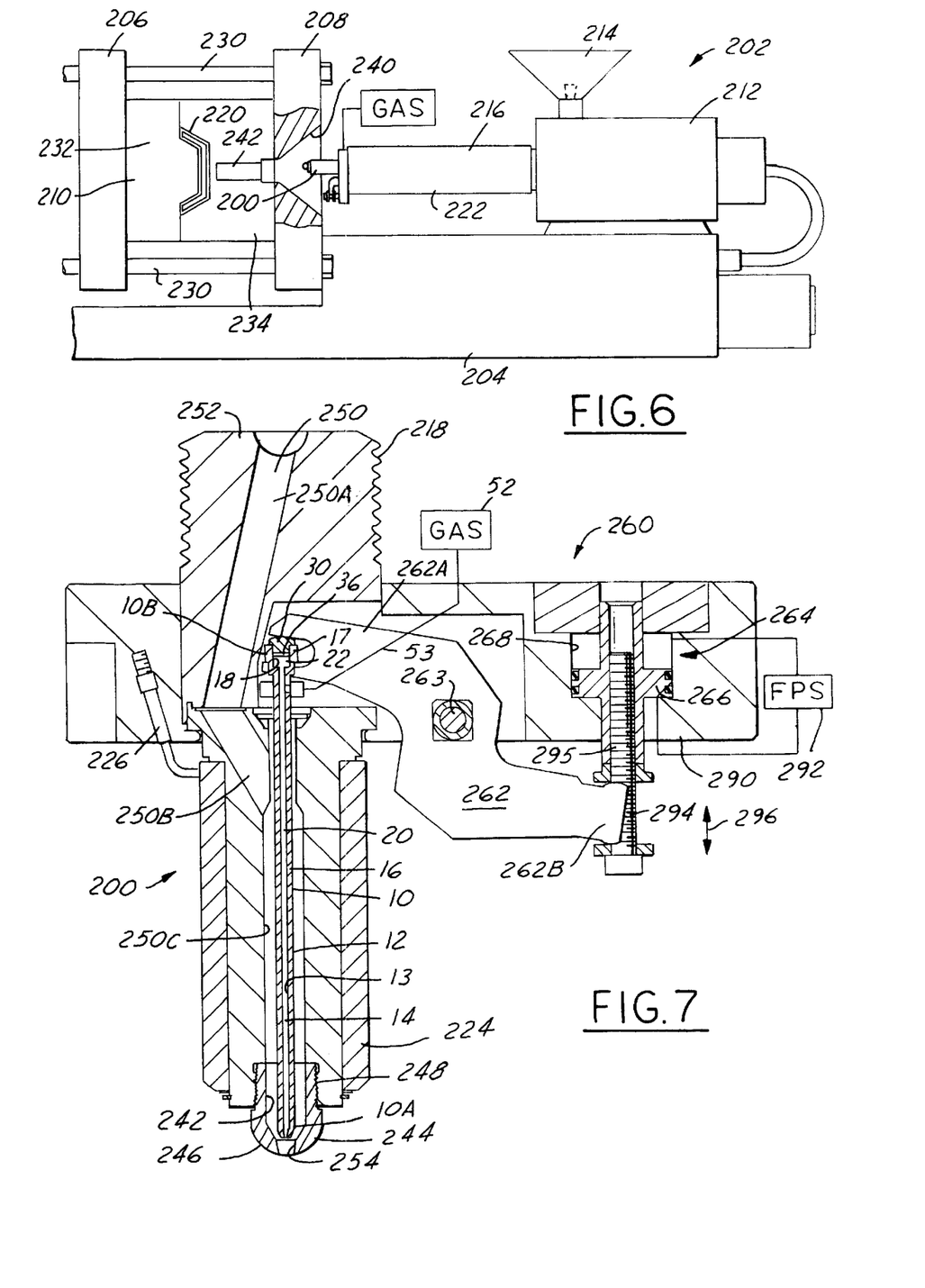
FIGS. 6 and 7 illustrate the use of the present invention in a machine nozzle.

Also, the present invention is particularly adapted for use with sprue bushings or machine nozzles. In this regard, the invention is described herein for use with one type of sprue bushing 80 (see FIG. 1) and one embodiment of machine nozzle (FIGS. 6–7). Of course, other sizes, shapes and types of sprue bushings, machine nozzles, and the like can be used with the present invention and fall within the spirit and scope thereof.

The valve-gate pin mechanism is generally referred to by the reference numeral 10 in the drawings. As particularly shown in FIGS. 3 and 4, the pin mechanism includes an outer pin member 12 having an elongated passageway 13 and an inner pin member 14 positioned within the elongated hollow passageway 13. The outer hollow pin member 12 has an elongated body portion 16 and an enlarged head portion 17. The head portion has a central cavity 18. The inner pin member 14 similarly has an elongated body portion 20 and an enlarged head portion 22. The head portion 22 is positioned within cavity 18. A seal member 24 is positioned in annular cavity or groove 25 in the head portion 22 in order to seal the two head portions 17 and 22 together and prevent the passage of gas or other fluids. It is to be understood that alternatively a sealing member and groove could be positioned in the wall of the cavity 18 for the same purpose.

A cap member 30 is positioned on the head portion 17 and has an insert portion 32 which fits within the cavity 18. The cap member 30 can be secured to the head portion 17 in any conventional manner, such as by bolts or other fasteners, or by a mating threaded mechanism 34.

A spring member 36 is positioned between the insert portion 32 and the head portion 22 of the inner pin member. More specifically, the spring member 36 is positioned between the lower surface 30A of the cap member 30 and the upper surface 22A of the head portion 22.

The spring member is preferably a spring washer member, such as a Belleville washer. It is understood, of course, that other spring biasing members could be utilized in place of a spring washer member such as a small coil spring member or the like, and that more than one spring member could be utilized, depending on the amount of biasing force desired.

The lower end 10A of the pin mechanism is adapted to mate with an orifice 40 in a mold member 42 (or sprue bushing 80 or machine nozzle 200 as described below). The orifice 40 opens into a cavity 44 in a mating mold member 46. The lower end 10A mates with the orifice 40 to form a valve mechanism which controls the flow of plastic material from plastic passageway 48 into the mold cavity 44. Plastic is introduced into the passageway 48 through conduit 49 from a plastic injection molding machine ("IM") 50.

Pressurized gas from source 52 ("GAS") is introduced through conduit 53 to passageway 13 in the outer pin member 12. The movement of inner pin member 14 relative to outer pin member 12 controls the entry of gas into the mold cavity 44. In this regard, the lower end 13A of passageway 13 is tapered and forms a valve mechanism 56 with the tapered lower end 14A of inner pin member 14.

The spring member 36 biases the inner pin member 14 towards the valve-closed position, as shown in FIG. 3. In this situation, the valve mechanism 56 is closed and prevents gas in passageway 13 from entering the mold cavity 44. In order to open the valve mechanism 56 to the valve-open position as shown in FIG. 4, pressurized gas from source 52 is introduced into passageway 13 where it acts on surface 22B of the head portion 22 of the inner pin member 14. When the force of the gas, represented by arrow 60 in FIG. 4, overcomes the force of the spring member 36, represented by arrow 62, the spring member flexes and flattens allowing the inner pin member 14 to move axially upwardly and open valve mechanism 56.

When gas pressure is not applied, some plastic pressure in the mold cavity or runner system will also act on surface 64 on the end of the inner pin member 14. However, the area of surface 64 is insufficient to provide a force sufficient to overcome the force of the spring member 36.

In summary, when gas pressure is applied inside the pin mechanism 10, a force is created which unseats the valve pin and compresses the spring washer 36. When the washer compresses, the inner pin retracts and allows a path for the gas to escape at the end of the pins.

An annular groove 66 is provided on the end 12A of the outer pin member 12. The groove allows plastic material injected into the mold cavity 44 to form a seal which prevents gas introduced into the cavity from passing around the outer surface of the plastic part being formed in the mold cavity. The seal helps direct the gas into the plastic mass in order to form a hollow cavity and expand the plastic against the walls of the mold cavity. The size of the groove 66 is sufficiently small to allow a thin flange or flash of plastic to be formed therein as the plastic starts to set up which, when forced against the walls of the groove by the gas, forms a satisfactory seal.

One preferred use of the present invention is shown in FIGS. 1 and 2. As shown, the pin mechanism 10 is connected to a piston member 70 and utilized in combination with a sprue bushing 80.

The sprue bushing 80 includes a body portion 82, a head portion 84, and an annular heater member 86. The heater member 86 is preferably an annular coil or resistive-type heating element and is powered by electricity through conduit 88. Heat from the heater member 86 maintains the plastic material in central passageway 90 in a molten condition.

The sprue bushing 80 is attached to a manifold 92. The manifold 92 has one or more conduits or passageways 94 which are connected to an injection molding machine ("IM") 50 which supplies molten plastic material to the passageway in a conventional manner. Plastic material in passageway 94 is maintained in a molten condition by one or more heating elements (not shown) positioned in or on manifold 92.

Passageway 94 has an opening 96 which is aligned with the passageway 90 in the sprue bushing in order to allow the flow of plastic material from the injection molding machine into the mold cavity 44, which is positioned in mold member 46. The sprue bushing 80 is positioned in cavity 98 in mold member 100.

A tip member 102 is threadedly secured to the end of the body member 82 of the sprue bushing 80. The tip member 102 has an outer surface 104 which mates with, and is positioned in, opening 106 in the mold member 100. The tip member 102 also has a central orifice 40 which mates with the lower end or tip 12A of the outer pin member 12.

The piston member 70 is positioned in cavity 110 in a block member 112. The piston member 70 is adapted to slide axially or longitudinally in the cavity or chamber 110 and is attached to the pin mechanism 10. In particular, the cap member 30 of the pin mechanism 10 is threadedly positioned in threaded opening or passageway 120 in the piston member 70. The threaded engagement between the pin mechanism 10 and the piston member 70 provides a secure connection between the two components and, at the same time, allows adjustment of the pin member relative to the piston member when desired in order to provide the desired mating of the lower end of the pin mechanism 10 in the orifice 40. In this regard, adjustment of the pin mechanism 10 axially relative to the piston member 70 can be accomplished by insertion of an instrument or tool through central opening 120. A conventional wrench socket or screwdriver slot 122 is provided in the cap member 30 for this purpose.

A cap member 130 is secured to the top of the block member 112 and securely holds the piston member 70 in the cavity 110. Movement of the piston member 70 in the chamber 110 is effectuated by introduction and exhaust of fluid pressure from a fluid pressure source ("FPS") 132. The fluid pressure source 132 is connected by conduits 134 and 136 to openings 135 and 137, respectively, which are in fluid communication with cavity 110 and on opposite sides of the piston member 70.

A plurality of seals or sealing members retain the fluid pressure in the cavity 110. These include seal 140 between the cap member 130 and the block member 112, seal 142 between the cap member 130 and the piston member 70, a pair of seals 144 positioned between the piston 170 and the walls of the chamber 110, and seal 146 which is positioned between the block member 112 and the piston member 70. The seals are positioned in annular grooves or cavities and prevent leakage of the hydraulic or pneumatic fluid from the fluid power source.

In operation, the piston member 70 is moved axially in the chamber 110 by appropriate application of fluid pressure from the FPS through openings 135 and 137. In this regard, pressure introduced through conduit 134 and opening 135 will force the piston member 70 toward surface 10A of the chamber 110 and in turn lower the pin mechanism 10 into mating engagement with orifice 40. Similarly, when fluid pressure is relieved from chamber 110 through conduit 134 and fluid pressure is activated through conduit 136, the piston member 70 will be moved in chamber 110 toward surface 130A on the cap member 130, thus raising the pin mechanism 10 and opening the orifice 40.

Gas or other desired fluid is introduced through conduit 53 into the annular passageway 13 between the outer pin member 12 and the inner pin member 14. In this regard, the operation of the pin mechanism 10 relative to allowing introduction of gas from source 52 into the plastic material P in the mold cavity 44 is the same as that described above with reference to FIGS. 3 and 4. Thus, when gas is supplied from source 52 into the annular passageway 13 between the pin members 12 and 14, the spring member 36 is compressed, and the inner pin member 14 is moved axially upwardly relative to outer pin member 12 allowing gas to flow into the plastic material P. At the rest or closed position when gas is not being supplied to pin mechanism 10, the spring member 36 provides a biasing force on the inner pin member 14 preventing gas from flowing through the annular passageway and into the plastic material.

In operation of the injection molding system shown in FIGS. 1 and 2, the piston member 70 is moved longitudinally in the block member 112 in order to open and close the orifice 40 to allow introduction of plastic material from the injection molding machine 50 into the mold cavity 44. In this regard, when the piston member 70 is in the position shown in FIG. 1, the lower end 10A of the pin mechanism 10 is raised above the orifice 40 allowing plastic in passageway 90 to flow into the mold cavity 44. When the desired amount of plastic material is injected into the mold cavity, the fluid power source is activated and the piston member 70 is moved to the position shown in FIG. 2. This causes the lower end 10A of the pin mechanism 10 to mate with the orifice 40 and prevent further flow of plastic material into the mold cavity. In this regard, the lower end 10A of the pin mechanism 10 and the walls of the orifice 40 form a valve mechanism 56.

When it is desired to inject gas or another fluid into the plastic material in the mold cavity, gas is introduced from source 52 into the annular passageway in the pin mechanism 10, thereby moving inner pin member 14 relative to outer pin member 12 and allowing gas to enter the plastic material P as described above with reference to FIGS. 3–4.

The gas pressure is held in order to pack out the molded part, which also keeps the inner pin retracted. When the gas pressure is released or vented, the inner pin stays retracted until the remaining pressure in the system decreases sufficiently for the force of the compressed washer to overcome the force generated by the gas. When the inner pin shuts off again, the pressure of the remaining gas in the part is sufficiently low in order not to damage the part upon ejection from the mold.

The block member 112 is separated or spaced from the manifold 92 by a plurality of spacers or risers 99. The block member 112, spacer members 99, manifold 92 and mold member 100 are connected together in a conventional manner, such as by bolts, other fasteners, clamp mechanisms, and the like.

Figure 5:
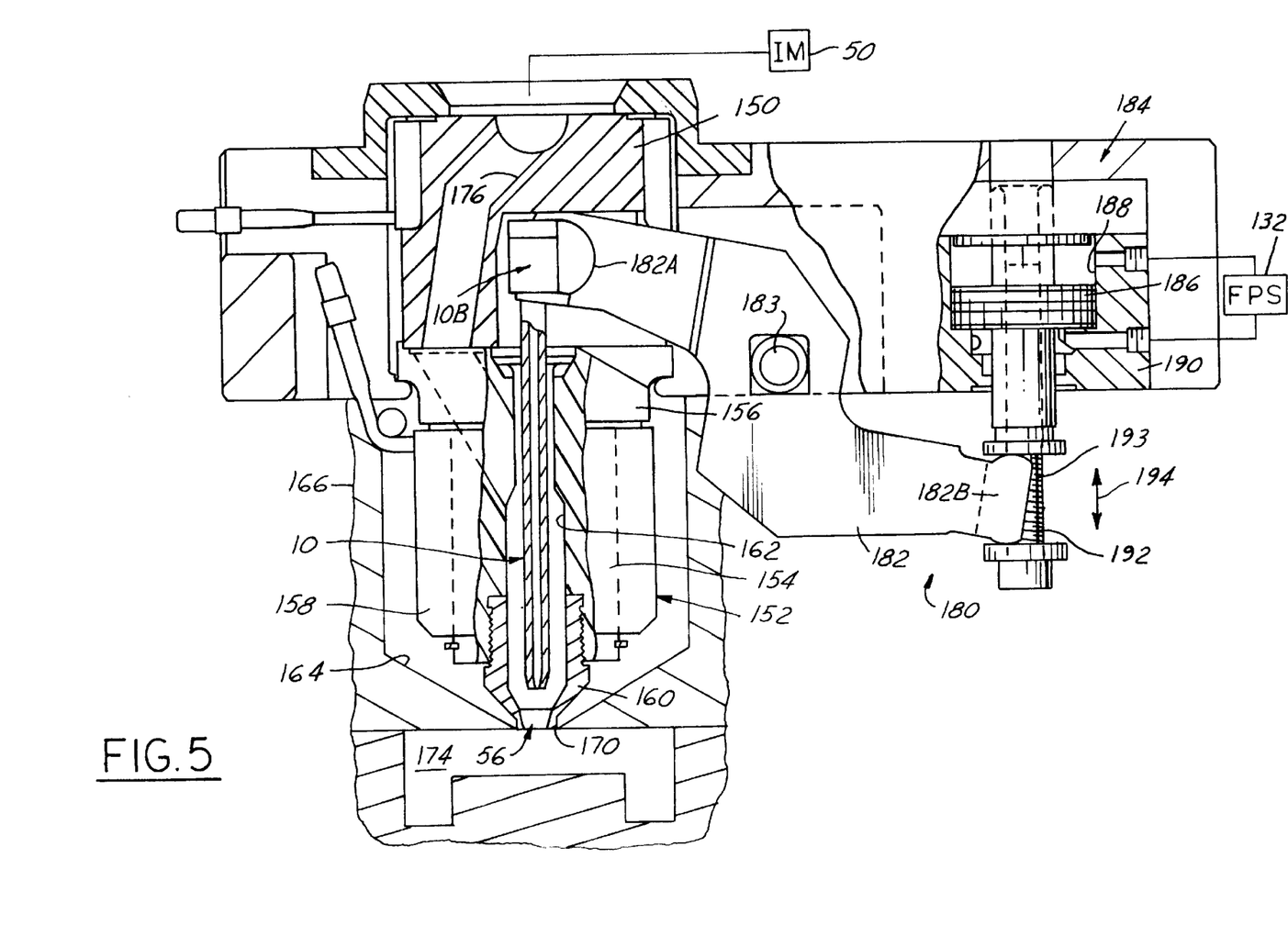
FIG. 5 illustrates an alternate proposed use for the present invention.

Another embodiment illustrating use of the present invention is shown in FIG. 5. In this embodiment, the gas valve pin is used in a single valve-gate application.

In FIG. 5, the present inventive pin mechanism 10 is used with a system or mechanism which controls the flow of plastic material into an injection mold cavity. In this regard, plastic material is injected from an injection molding machine ("IM") 50 directly into an adapter mechanism 150 which is attached to a sprue bushing 152. Plastic from the injection molding machine 50 is inserted through passageway 176 in adapter member 150 and into passageway 162 in the sprue bushing 152. The sprue bushing 152 is similar to the sprue bushing 80 as described above with reference to FIG. 1. The sprue bushing 152 has a central body member 154, a head member 156, an annular heating member 158 and a tip member 160. The body member 154 has a central passageway 162 in which plastic material is allowed to pass through into a mold cavity 174. The sprue bushing 152 is positioned in a cavity 164 in a mold member 166. The mold member 166 has an opening 170 in which the tip member 160 is positioned. Mold member 172 is positioned in contact with mold member 166 and contains cavity 174 in which the plastic material is injected.

Axial movement of the pin mechanism 10 opens and closes the valve member 56 in the sprue bushing in order to either allow the injection of plastic material into the mold cavity or prevent further injection. Movement of the pin mechanism 10 is actuated by actuation mechanism 180. Actuation member 180 includes a pivoted arm member 182 and a piston mechanism 184. The piston mechanism 184 includes a piston member 186 positioned in a chamber 188 in a housing 190. Fluid from a fluid pressure source 132 operates and controls the operation of the piston member 186 in the cavity 188. Operation of the piston member 186 in turn operates movement of rod member 192 in the direction of the arrow 194. Movement of the rod member 192 pivots arm member 182 around pivot member 183. One end 182A of the arm member 182 is attached to the upper end 10B of the pin mechanism 10 while the other end 182B of the arm member is connected to the rod member 192. Pivoting of the arm member 182 acts to move the pin mechanism 10 axially or longitudinally relative to the sprue bushing 152. This in turn opens and closes the valve member 56 which controls the injection of plastic material into the mold cavity.

In operation, movement of the piston member 186 and rod member 192 moves end 182B of the arm member 182 which in turn moves end 182A of the arm member 182 in the opposite direction causing the pin mechanism 10 to open and close the valve mechanism 56. Adjustment of the position of the pin mechanism 10 in forming the valve mechanism 56 is accomplished by adjusting the length of the rod member 192 relative to the piston member 186. The rod member 192 is threadedly secured to the piston member 186 by threads 193 for this purpose.

FIGS. 6 and 7 illustrate the use of the present invention in a machine nozzle. A machine nozzle is a standard part of an injection molding machine. In FIG. 6, the injection molding machine is generally referred to by the reference numeral 202. The injection molding machine 202 is typically positioned on a common base 204, together with a pair of platen members 206 and 208, which are used to hold a mold 210 for formation of a molded plastic part. The injection molding machine 202 typically includes a body 212, a hopper 214, and a barrel member 216, together with the machine nozzle 200. As indicated, the machine nozzle 200 is positioned on the forward end of the barrel 216. In this regard, the machine nozzle 200 is typically threaded or screwed onto the end of the barrel member 216 and held by a plurality of threads 218, as shown in FIG. 7.

In an injection molding process, plastic pellets are inserted into the injection molding machine 202 through the hopper member 214 into a central cavity or chamber (not shown). A rotating screw member (not shown) is positioned in the chamber and is used to convey the plastic material through the barrel and machine nozzle and into the mold cavity 220. A plurality of heater members 222 positioned on the outside of the barrel member 216 and other strategic locations on or in the injection molding machine 202 melt the plastic material and keep it in a molten condition so that it can be injected through the machine nozzle and into the mold cavity. In this regard, a heater member 224 is also typically positioned around the outer end of the machine nozzle 200, as shown in FIG. 7. The heater member 224 is typically a coil or resistant heater and, in this instance, is energized or powered through a lead or connector 226.

The platen member 206 is moveable relative to stationary platen member 208. The two platen members are connected and moveable along rod members 230. In this regard, typically four rod members 230 are provided.

The mold 210 typically comprises a core member 232 and a cavity member 234. The two mold members (232 and 234) are connected to the two platen members 206 and 208, respectively. In this manner, the mold 210 can be opened or closed depending on relative movement of the platen member 206 relative to the stationary platen member 208.

The machine nozzle 200 is inserted through an opening 240 in platen member 208 and forced directly against a "sprue bushing" 242 or the like in order to inject molten plastic material directly into the mold cavity 220. For this purpose, the machine nozzle 200 has a tip member 244 at its outer or digital end which has a spherical mating surface 246 for mating with the "sprue bushing" or the like. The tip member 244 is typically threadedly secured to the end of the machine nozzle 200 by thread mechanism 248.

Molten plastic material entering the machine nozzle 200 is inserted into passageway 250 at end 252 and subsequently injected into the mold cavity through an orifice 254 in the tip member 244. The passageway 250 includes a first portion 250A, a second portion 250B, and a third portion 250C. The passageway portions 250A and 250B are angled, as shown in FIG. 7, in order to provide space for the actuation mechanism 260 which is explained in more detail below. The passageway portion 250C is centrally located in the machine nozzle 200 and allows plastic material to flow around pin mechanism 10 and into the tip member 244.

The pin mechanism 10 is substantially the same as the pin mechanism 10 described above with reference to FIGS. 1–5. In this regard, the pin mechanism 10 includes an outer pin member 12 having an elongated passageway 13 and an inner pin member 14 positioned within the passageway 13. The hollow outer pin member 12 has an elongated body portion 16 and an enlarged head portion 17. The head portion has a central cavity 18. The inner pin member 14 similarly has an elongated body portion 20 and an enlarged head portion 22, which is positioned within the cavity 18.

A cap member 30 is positioned on the head portion 17, and the spring member 36 is positioned between the cap member and the head portion 22. The spring member 36 is preferably a spring washer member, such as a Belleville washer, although other equivalent spring biasing members can be utilized, as set forth above.

The lower end 10A of the pin mechanism is adapted to mate with the orifice 254 in the tip member 244 on the nozzle member 200. The lower end 10A and orifice 254 form a valve mechanism which controls the flow of plastic material from the plastic passageway 250 and eventually into the mold cavity 220.

Pressurized gas from source 52 (GAS) is introduced through conduit 53 to passageway 13 in the outer pin member 12. The movement of the inner pin member 14 relative to the outer pin member 12 controls the entry of gas into the mold cavity 220. In this regard, the lower end of the passageway 13 is tapered and forms a valve mechanism with a corresponding tapered lower end of inner pin member 14 (as explained above).

Pin mechanism 10 operates in the same manner as described above. In summary, when gas pressure is applied inside the pin mechanism 10, a force is created which unseats the valve pin and compresses the spring washer 36. This allows gas to flow from the pin mechanism and into the plastic material and mold cavity. When the washer compresses, the inner pin retracts and allows a path for the gas to flow at the end of the pin.

Movement of the pin mechanism 10 is actuated by actuation mechanism 260. The actuation member 260 includes a pivoted arm member 262 and a piston mechanism 264. The piston mechanism 264 includes a piston member 266 positioned in chamber 268 in housing 290. Fluid from a fluid pressure source ("FPS") 292 operates and controls the operation of the piston member 266 in the cavity 268. Operation of the piston member 266, in turn, operates movement of rod member 294 in the direction of the arrow 296. Movement of the rod member 294 pivots the arm member 262 around pivot member 263. One end 262A of the pivoted arm member 262 is attached to the upper end 10B of the pin mechanism 10, while the other end 262B of the arm member 262 is connected to the rod member 294. Pivoting of the arm member 262 acts to move the pin mechanism 10 axially or longitudinally relative to the machine nozzle 200. This, in turn, opens and closes the orifice 254, which controls injection of plastic material into the mold cavity.

The operation of the pivot member 262 is substantially the same as the operation of the pivoted arm member 182 described above with reference to FIG. 5. In operation, movement of the piston member 266 and rod member 294 moves the end 262B of the arm member 262 which, in turn, moves the end 262A of the arm member 262 in the opposite direction, causing the pin mechanism 10 to open and close the valve mechanism at the orifice 254. Adjustment of the position of the pin mechanism 10 in forming the valve mechanism is accomplished by adjusting the length of the rod member 294 relative to piston member 266. The rod member 294 is threadedly secured to the piston member 266 by threads 295 for this purpose.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A gas pin mechanism comprising:

an outer pin member having an internal passageway; said outer pin member having a first body portion, a first head portion at one end and a first valve member at the other end, said first head portion having a cavity therein;

an inner pin member; said inner pin member having a second body portion positioned in said internal passageway, a second head portion at one end and positioned in said cavity in said first head portion and a second valve member at the other end adapted to mate with said first valve member;

a spring member positioned longitudinally behind said second head portion and biasing said inner pin member relative to said outer pin member in a direction to mate said first and second valve members; and said first valve member and said second valve member forming a valve mechanism for controlling the flow of a fluid material therethrough;

wherein fluid material introduced against said second head portion can overcome said biasing of said inner pin member and separate said first and second valve members in order to allow flow of fluid material therethrough.

2. The gas pin mechanism as set forth in claim 1 wherein said spring member comprises a spring washer.

3. The gas pin mechanism as set forth in claim 2 wherein said spring washer comprises a Belleville washer member.

4. The gas pin mechanism as set forth in claim 1 wherein said spring member biases said valve mechanism to a closed position preventing flow of a fluid therethrough.

5. The gas pin mechanism as set forth in claim 1 further comprising a gas input opening into said pin mechanism in order to allow gas to flow into a space between said inner and outer pin members.

6. The gas pin mechanism as set forth in claim 1 wherein injection of gas into said pin mechanism overcomes the biasing force of said spring member and opens said valve mechanism.

7. The gas pin mechanism as set forth in claim 5, wherein said second head portion has an enlarged surface which is exposed to gas pressure introduced through said gas input opening.

8. A valve-gate bushing mechanism comprising:

a bushing having a first internal passageway with a first valve member at a discharge end; and a gas pin mechanism positioned in said bushing for controlling the discharge of plastic material from said discharge end, said gas pin mechanism comprising:

an outer pin member having a second internal passageway, a first body portion, a first head portion at one end and a second and third valve member at the other end adapted to mate with said first valve member, said first head portion having a cavity therein;

an inner pin member; said inner pin member having a second body portion positioned in said second internal passageway, a second head portion at one end positioned in said cavity in said first head portion, and a fourth valve member at the other end adapted to mate with said third valve member;

a spring member positioned longitudinally behind said second head portion and biasing said inner pin member relative to said outer pin member in a direction to mate said third and fourth valve members; and said first and second valve members forming a first valve mechanism for controlling the flow of a plastic material therethrough, and third and fourth valve members forming a second valve mechanism for controlling the flow of a gas material therethrough.

9. The valve-gate bushing mechanism as set forth in claim 8 further comprising a moveable piston member attached to said pin mechanism for controlling the movement of said pin mechanism in said bushing mechanism.

10. The valve-gate bushing mechanism as set forth in claim 8 wherein said spring member comprises a spring washer.

11. The valve-gate bushing mechanism as set forth in claim 10 wherein said spring washer comprises a Belleville washer member.

12. The valve-gate bushing mechanism as set forth in claim 8 wherein said spring member biases said second valve mechanism to a closed position preventing flow of a fluid therethrough.

13. The valve-gate bushing mechanism as set forth in claim 8 further comprising a gas input opening into said pin mechanism in order to allow gas to flow into a space between said inner and outer pin members.

14. The valve-gate bushing mechanism as set forth in claim 8 wherein injection of gas into said pin mechanism overcomes the biasing force of said spring member and opens said valve mechanism.

15. The valve-gate bushing mechanism as set forth in claim 13, wherein said second head portion has an enlarged surface which is exposed to gas pressure introduced through said gas input opening.

16. The valve-gate bushing mechanism as set forth in claim 8 further comprising an actuation mechanism connected to said gas pin mechanism for controlling the movement of said pin mechanism in said bushing mechanism.

17. The valve-gate bushing as set forth in claim 16, wherein said actuating mechanism comprises a pivoting arm member and a piston mechanism.

18. The valve-gate bushing as set forth in claims 17 wherein said pivoting arm member has a first end connected to said pin mechanism and a second end connected to said piston mechanism.

19. A valve-gate machine nozzle mechanism comprising:

a machine nozzle having a first internal passageway with a first valve member at a discharge end; and a gas pin mechanism positioned in said bushing for controlling the discharge of plastic material from said discharge end, said gas pin mechanism comprising:

an outer pin member having a second internal passageway, a first body portion, a first head portion at one end and a second and third valve member at the other end adapted to mate with said first valve member, said first head portion having a cavity therein;

an inner pin member; said inner pin member having a second body portion positioned in said second internal passageway, a second head portion at one end positioned in said cavity in said first head portion, and a fourth valve member at the other end adapted to mate with said third valve member;

a spring member positioned longitudinally behind said second head portion and biasing said inner pin member relative to said outer pin member in a direction to mate said third and fourth valve members; and said first and second valve members forming a first valve mechanism for controlling the flow of a plastic material therethrough, and third and fourth valve members forming a second valve mechanism for controlling the flow of a gas material therethrough.

20. The valve-gate bushing mechanism as set forth in claim 19 wherein said spring member comprises a spring washer.

21. The valve-gate bushing mechanism as set forth in claim 20 wherein said spring washer comprises a Belleville washer member.

22. The valve-gate bushing mechanism as set forth in claim 19 wherein said spring member biases said second valve mechanism to a closed position preventing flow of a fluid therethrough.

23. The valve-gate bushing mechanism as set forth in claim 19 further comprising a gas input opening into said pin mechanism in order to allow gas to flow into a space between said inner and outer pin members.

24. The valve-gate bushing mechanism as set forth in claim 19 wherein injection of gas into said pin mechanism overcomes the biasing force of said spring member and opens said valve mechanism.

25. The valve-gate bushing mechanism as set forth in claim 23 wherein said second head portion has an enlarged surface which is exposed to gas pressure introduced through said gas input opening.

26. The valve-gate bushing mechanism as set forth in claim 19 further comprising an actuation mechanism connected to said gas pin mechanism for controlling the movement of said pin mechanism in said bushing mechanism.

27. The valve-gate bushing as set forth in claim 26 wherein said actuating mechanism comprises a pivoting arm member and a piston mechanism.

28. The valve-gate bushing as set forth in claim 27 wherein said pivoting arm member has a first end connected to said pin mechanism and a second end connected to said piston mechanism.

* * * * *